United States Patent [19]

Cain et al.

[11] 4,295,206
[45] Oct. 13, 1981

[54] DOCUMENT SORTING METHOD

[75] Inventors: John D. Cain, Kitchener; Gary C. Lovie, Waterloo, both of Canada

[73] Assignee: NCR Canada Ltd.-NCR Canada Ltee, Mississauga, Canada

[21] Appl. No.: 45,820

[22] Filed: Jun. 6, 1979

[51] Int. Cl.³ .............................................. G06F 7/08
[52] U.S. Cl. ................................................... 364/900
[58] Field of Search ... 364/200 MS File, 900 MS File, 364/300; 235/425

[56] References Cited

U.S. PATENT DOCUMENTS

| | | | |
|---|---|---|---|
| 2,994,066 | 7/1961 | Mendelson et al. | 364/200 |
| 3,324,459 | 6/1967 | Woolfork | 364/200 |
| 3,444,523 | 5/1969 | Dirks | 364/900 |
| 3,651,483 | 3/1972 | Clark et al. | 364/200 |
| 3,815,083 | 6/1974 | Dirks et al. | 364/900 |
| 4,003,031 | 1/1977 | Kashio | 364/900 |
| 4,101,968 | 7/1978 | Florence | 364/900 |

Primary Examiner—James D. Thomas
Attorney, Agent, or Firm—J. T. Cavender; Wilbert Hawk, Jr.; George J. Muckenthaler

[57] ABSTRACT

A document sorting process utilizes existing or natural incoming sequences of documents each of which includes a sort key code thereon and which are sequentially arranged in accordance with a trace, locate and retrieve number (TLR). The documents are machine-sorted by the sort key code in numerical sequence and the corresponding trace, locate and retrieve number is checked for ascending or descending order. Whenever the trace, locate and retrieve number is seen in ascending order, the created sort number remains the same, whereas on a descending record the sort number is incremented by one digit. A reduction in the number of sort numbers reduces the passes required for physically sorting the documents.

8 Claims, 7 Drawing Figures

DOCUMENT SORTING METHOD

BACKGROUND OF THE INVENTION

In the field of data processing, the sorting of documents such as bank checks requires numerous operations and routing of the checks past various devices for separating the checks and moving them into pockets or bins according to a desired format. The sorting process may include arranging a number of documents into a sequence as determined by information recorded on the document and sensed by readers which are adjacent the flow or path of the documents.

While the number of sorting pockets or bins which make up part of a sorting machine may vary from a pair of pockets to as many as twenty or more, it is desirable to simplify the sorting operation and to reduce the number of steps or instructions which are utilized in the operation. In this manner, the programmed format or instruction is easier to implement into the operation and to follow through in the performing of the processing operation.

Representative prior art in document sorting apparatus is disclosed in U.S. Pat. No. 3,304,080, issued to B. J. Greenblott et al on Feb. 14, 1967, wherein documents are sorted by merging according to their ascending or descending sequential value and using pairs of groups of document magazines operable with document transport belts. Control means operates to move the document having the lowest value and comparing it with previous values until a break in sequence occurs. A new magazine in the group is selected and the comparing process is repeated until all documents compared in the first group are lower than the last document with continuation of the process until a single sequence results.

U.S. Pat. No. 3,324,459, issued to R. L. Woolfolk on June 6, 1967, discloses program changing in data processing wherein a method and apparatus use means for changing the contents of a memory storing the sorting program of an apparatus for sorting documents. A program change document is used and fed to the sorting apparatus wherein the change document has recorded thereon the program change information along with a special symbol and the sorting apparatus detects the special symbol and changes the information stored in its memory in accordance with the program change information recorded on the document.

U.S. Pat. No. 3,380,029, issued to M. A. Goetz on Apr. 23, 1968, shows a sorting system employing a computer and a plurality of magnetic tape units and a control system made up of three control signal loops. A first loop develops sets of data signal combinations into sorted strings of a first order and a second loop performs a merge on the first order strings except for one string and then writes a string of the next higher order on a remaining tape unit. A third loop directs the alternating operation of the first and the second control loops.

U.S. Pat. No. 3,587,057, issued to P. N. Armstrong on June 22, 1971, shows a data sorting system with control means to sort records into an ascending or descending progression. The system sorts a file of records which contains more records than the capacity of the system by repeated circulation of the file. Each record has an identifying number and sorting is accomplished by a representation of an increasing sequence of numbers wherein each succssive record is compared with previous records.

U.S. Pat. No. 3,662,402, issued to K. L. Bond et al. on May 9, 1972, discloses a data sort method utilizing finite difference tables wherein a sequence of information items, each of which has an assigned numerical value, is sorted to obtain a list arranged in order of ascending or descending magnitude. This is accomplished by generating a difference table for the sequence and then interchanging various items of the sequence depending on the entries of the difference table. A fast memory is used to sort the information items in a short time and use a minimum of the access memory by means of a mathematical technique to move and sort the items in the fast access memory.

SUMMARY OF THE INVENTION

The present invention relates to a method of sorting documents and more particularly, to a process of utilizing the existing or natural incoming sequences of documents and assigning sort numbers to the documents for reducing the number of identifying operations or passes in sorting the documents. The method includes physically sorting a set of documents by means of a sort key which is in machine-readable form on each of the documents and by means of a created sort number for each of the documents. The processing technique includes the steps of building a data file of the documents with a record for each document which contains a sort key or code thereon and a physical sequence number which is otherwise known as a trace, locate and retrieve number (TLR). The next step is to sort the document record or data file into sequence by use of the trace, locate and retrieve number within the sort key or code, and the third step is to determine the number of different sort keys or codes. The fourth step is to assign a sort number to each document record so that all documents with the same sort key or code will have the same sort number. The sort number is in a base "B" wherein "B" is the number of sort pockets minus 1 and the sort number would be stored in the document record. The final step is to sort the document records back into their original input sequence corresponding to the trace, locate and retrieve number (TLR) and the physical document sorting then proceeds under the control of the data file by using the sort number for directing the physical documents into the desired or respective pockets.

The processing technique takes advantage of existing sequences in the stream of documents and the sort number is assigned to the documents as the document file is sequentially read by use of the sort number assigned in the fourth step mentioned above. As the document records are identified, the trace, locate and retrieve number is checked for ascending order thereof and all document records, which fall within an ascending order TLR, are given the same sort number. If a descending trace, locate and retrieve number is seen by the sensing means or identified thereby, the process will cause the sort number to be incremented by one digit. The number of sort numbers is substantially reduced by reason of utilizing the natural incoming document sequences of the stack of documents. In one manner of the invention, a sorting machine is used to sort the physical documents in as short a period of time as possible with a minimum number of pockets.

In view of the above discussion, the principal object of the present invention is to provide a method of sorting a plurality of documents by readable code means on the documents.

An additional object of the present invention is to provide a process of sorting a plurality of documents by utilizing the existing sequence thereof and assigning sort numbers which are responsive to ascending or descending codes of the documents.

Another object of the present invention is to provide a method of sorting data in reduced number of steps required over the instructional format with a corresponding reduced number of sort numbers.

A further object of the present invention is to provide a document sorting process wherein sort numbers are derived from a step of identifying ascending or descending code numbers of the documents.

Additional advantages and features of the present invention will become apparent and fully understood from a reading of the following description taken with the annexed drawing.

DESCRIPTION OF THE PREFERRED EMBODIMENT

Figure 1:
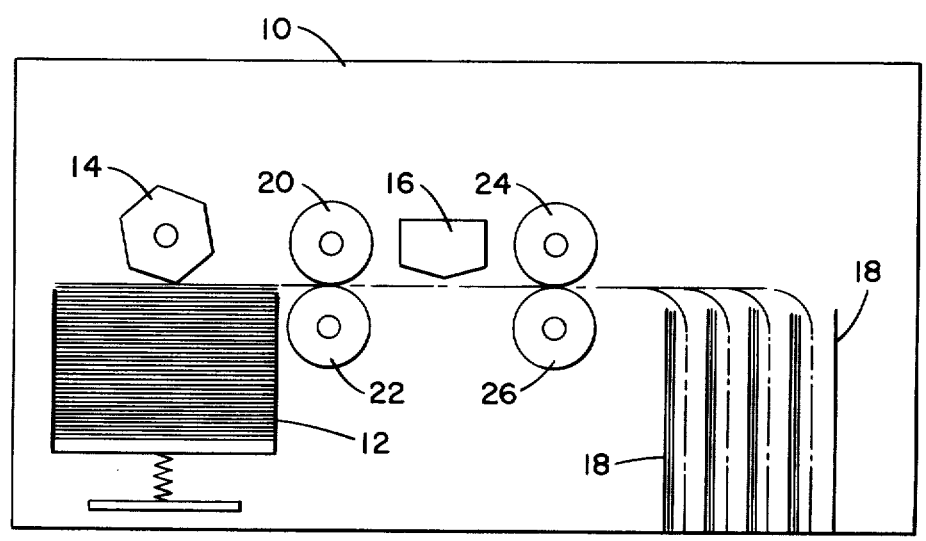
FIG. 1 is a diagrammatic view of apparatus wherein the subject matter of the present invention may be incorporated or utilized.

Referring now to the drawing, FIG. 1 is a plan or top view in diagrammatic form of apparatus commonly used for physically separating or sorting documents into a desired arrangement. The apparatus 10 includes a hopper 12 for receiving batches or bundles of documents in random order and a feed mechanism 14 associated with the hopper feeds or delivers the documents in singular manner past a reader 16 which reads data from each document. A keyboard (not shown) may be provided for the operator to enter data for missing or unreadable fields on the documents. A plurality of pockets 18 are provided to receive or accept the sorted documents in the desired arrangement. Cooperating rollers 20 and 22 are positioned between the feed mechanism 14 and the reader 16, and rollers 24 and 26 are located between the reader 16 and the pockets 18 for driving the documents along a path from the hopper 12 to the pockets 18. While the present invention uses a number of the same file processing steps of the traditional or previous document separating methods, the difference occurs in the method of assigning sort numbers to the stream of documents.

One of the early mechanized solutions for physically sorting a plurality of documents was to use an eleven-pocket sorter with means for reading a machine-readable sort key on the documents and then performing a base "10" digital sorting procedure. In this process, the documents were passed through the sorter once for each base "10" digit in the short key.

The next step in the sorting of a plurality of documents was to increase the number of sorter pockets and to change or rebase the base "10" sort key to a base "B" of N-1 wherein "N" equals the number of sorter pockets. The number of passes "P" required for the documents would equal $\uparrow \log_B (10^D - 1) \uparrow$ where "D" equals the number of base "10" digits in the sort key. It is noted that the included arrow requires that the answer be taken to the next higher integer.

Subsequently, a high-speed random access storage device was added to the sorter. However, a process file had to be set up prior to physically sorting the documents. The process file would include a record for each document with the record containing a sort key and a physical sequence number which is specifically a trace, locate and retrieve number (TLR) and the document records are then sorted into sequence by using the trace, locate and retrieve number within the sort key and with subsequent determination of the number of different sort keys. A sort number is then assigned to each document record so that all documents with the same sort key will have the same sort number. The sort number would be stored in the document record and would be in the base "B" wherein "B" equals the number of sorter pockets minus 1 with the assigned number starting at 0. The document records would then be sorted back into their original physical sequence number (TLR) which is the trace, locate and retrieve number. The physical sorting of the documents would then proceed under the control of the data file by using the sort number for directing the documents to the various pockets. The number of passes "P" required would be $\uparrow \log_B S \uparrow$ wherein "S" represents the number of sort keys. Since it is advantageous to reduce the number of pockets required for the sorting operation, the minimum number of pockets "A" required for a sort of "P" passes on "S" sort keys is $A = \uparrow S^{1/P} \uparrow$. Additionally, a data file would have to be created for each physical document pass to provide the pocketing information.

Figure 2:
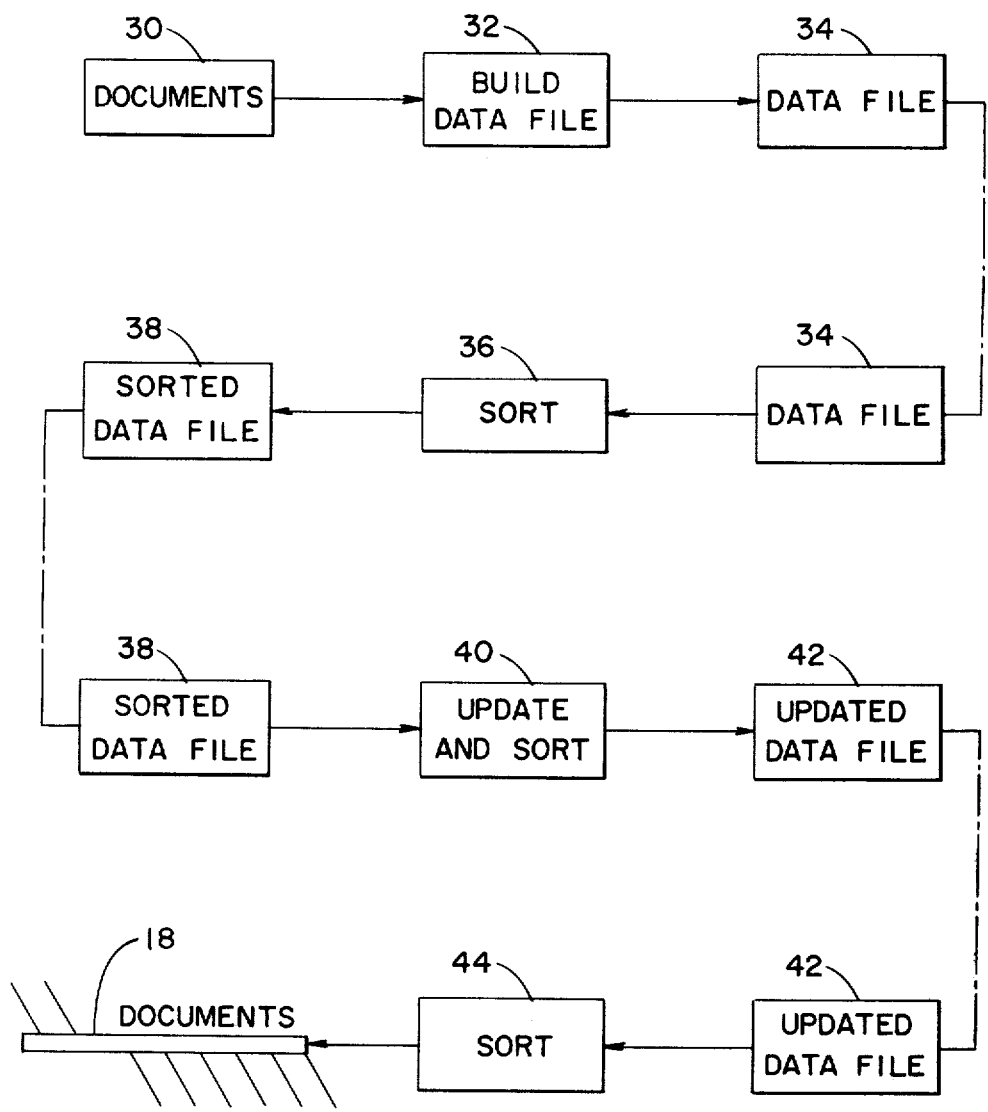
FIG. 2 is a system flowchart or diagram representing the steps of the method of sorting documents in accordance with the present invention.

FIG. 2 is an overall system flowchart showing the computer job steps within which the present inventive technique is utilized and includes reading the documents in document block 30 and extracting the pertinent data therefrom by reading the document data by means of block 32 and writing such data into a disc file to build the data file as represented by block 34. The next step includes sorting of the data file 34 by a sorter 36 into a sequence sort key/document input sequence number (identified as a trace, locate and retrieve (TLR) number) to create a sorted data file 38. The sort key is a number on each document which is machine readable and usually takes the form of the bank account number, and the TLR number is a physical sequence number assigned to each of the set of documents to make up the document record. The further step includes reading the sorted data file created in the previous step and using the technique of the present invention to assign a sort number to each data record, the details of which will be further described with reference to FIG. 3. The assigned sort number is inserted into each record through block 40 and the record updated in data file 42 along with sorting of the updated records into sequential order. The physical sorting of the documents is then executed under control of the data file created in the step of assigning the sort numbers to the data record along with updating of the data record and through the sort block 44, the documents are deposited into the pockets 18.

Figure 3:
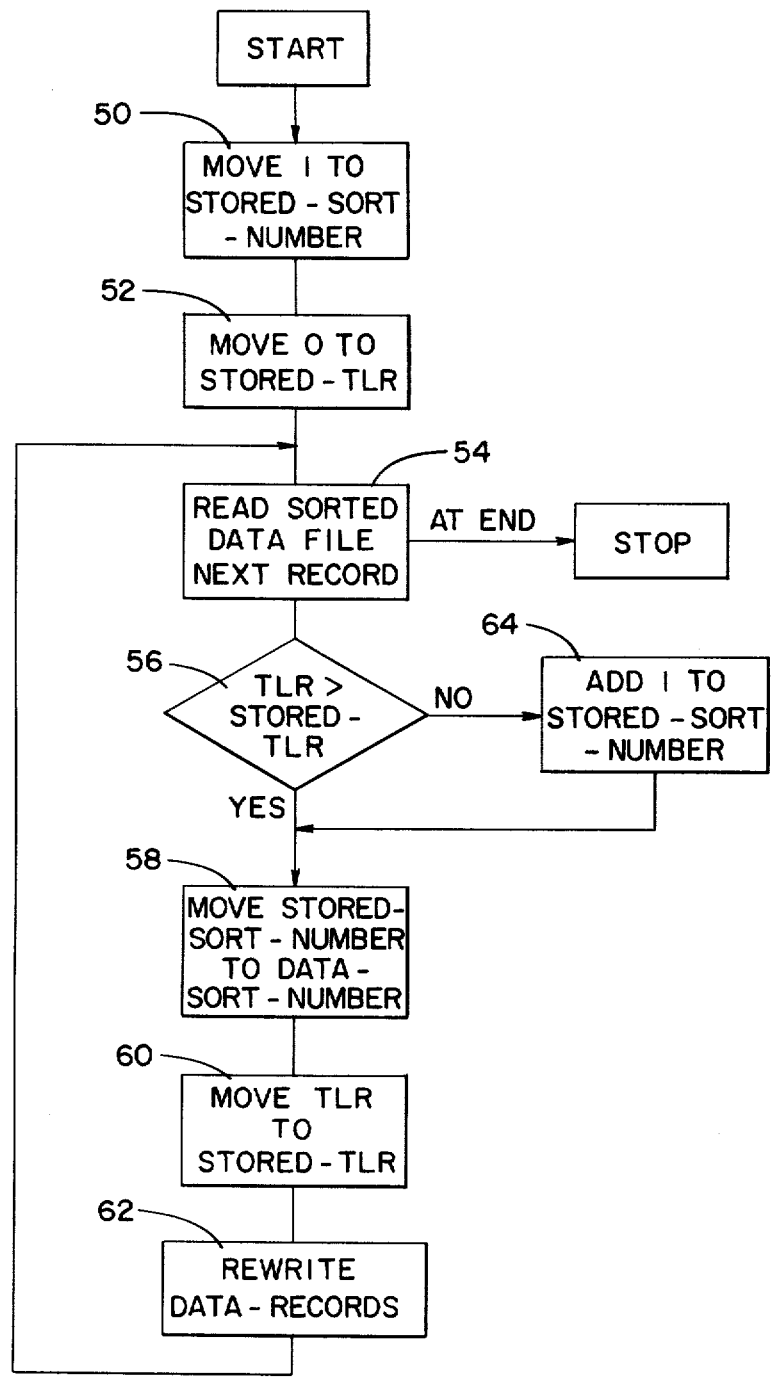
FIG. 3 is a process flowchart showing one of the steps of FIG. 2 in expanded form.

FIG. 3 represents a step-by-step flowchart showing in more detail the process which incorporates the inventive technique of the data file created in block 32 of FIG. 2. The inventive technique is termed "COMPRESS" as the acronym for COMputerized PRE-existing Sequence Sort. The first step of the process, as represented by block 50, comprises setting the process variable stored-sort-number to 1 and then setting the process variable stored-TLR (trace, locate and retrieve) number to 0 in block 52. The next data record from the data file is read into process memory through block 54. If the process has no more data records, the process will carry out its "end of job" routines and will stop.

Next, as represented by block 56, there is a comparing of the TLR number (physical sequence number) of the current data record with the variable stored-TLR number. If the TLR number of the current data record is greater than the stored-TLR number, the process will continue and will proceed to the next step. The stored-TLR will contain the TLR number of the previous data record which has been read. In block 58 the process assigns the stored-sort-number to the current data record and in block 60 the TLR number of the current data record replaces the contents of the variable stored-TLR. The final step of the process in block 62 comprises updating the current data record in the data file and proceeding to block 54 to read the next data record. If at step 4 in block 56 the TLR of the current record was not greater than the stored-TLR, the process includes the incrementing of the stored-sort-number by 1 through block 64 and proceeds to step 5 or block 58.

Figures 4, 5, 6, 7:
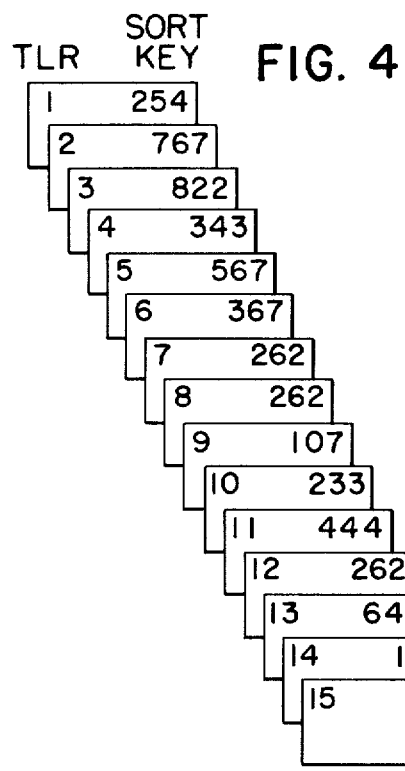
FIG. 4 shows a sequence of documents with sort keys thereon and assigned numeric order trace, locate and retrieve numbers.
FIG. 5 is an input file showing the arrangement of the document sequence of FIG. 2.
FIG. 6 is a process file sorted in accordance with numerically increasing sort keys.
FIG. 7 is a process file sorted by the numerically increasing sort keys with created sort numbers.

The "COMPRESS" technique of the present invention for a plurality of documents having trace, locate and retrieve (TLR) numbers assigned thereto and a sort key on each document in the nature of three digit numerals, as seen in FIG. 4, uses a number of the same file processing steps mentioned above. The difference between the present invention and the previous arrangements occurs in the method used in assigning the sort numbers. The physical document file (FIG. 4) is read sequentially to build an input data file, as seen in FIG. 5. The next step involves the file being sorted by the sort key wherein the three digit numbers in the sort key are arranged in ascending numerical order and within the sort key sorted by ascending trace, locate and retrieve (TLR) numbers, as seen in FIG. 6. As the document records are sequentially read, the trace, locate and retrieve number (TLR) for each document is checked for ascending order with the file being sorted by means of the sort key and then creating sort numbers, as seen in FIG. 7. All the documents are given the same sort number until a descending trace, locate and retrieve number (TLR) is encountered, at which time the sort number is incremented by 1. As can be seen from FIG. 7, one or more groups of sort keys are assigned the same sort number. The illustrated fifteen documents to be sorted have a sort key which includes two repeated numerals 262 and one repeated numberal 822 which, under conventional sorting methods, would require twelve sort numbers for the fifteen documents. The present invention requires only six sort numbers in the arrangement by using natural incoming document sequences to reduce the number of document keys to be sorted and enables faster sorting of the documents, or as an alternative, reduces the hardware required for a given sorting operation.

It is thus seen that herein shown and described is a method of sorting documents by using and taking advantage of pre-existing sequences in streams of documents. The method enables the accomplishment of the objects and advantages mentioned above, and while a preferred embodiment of the invention has been disclosed herein, variations thereof may occur to those skilled in the art. It is contemplated that all such variations and modifications not departing from the spirit and scope of the invention hereof are to be construed in accordance with the following claims.

What is claimed is:

1. A method of sorting documents into selected pockets of a sorter by utilizing pre-existing incoming sequences in a stream of documents comprising the steps of:
    building a data file of document records from reading a sort key on each document in physical sequential order,
    arranging said data file of document records in numerical sequence corresponding to said sort key, those document records having the same sort key being arranged in order of physical sequence,
    assigning sort numbers to said document records in a manner wherein all documents having the same sort key are assigned the same sort number in ascending physical sequence order and incrementing the sort number by one upon encountering a descending physical sequence order, and sorting the documents to pockets corresponding to sort numbers assigned to said document records within the data file.

2. In a data processing system, a method of sorting a plurality of documents into selected pockets of a sorter comprising the steps of:
    building a record file of data from said documents in physical sequential order with each document containing a sort key thereon,
    determining the number of different sort keys for said documents by arranging the record file of data in sort key numerical order, those document records in the record file having the same sort key being arranged in physical sequence,
    assigning sort numbers to said record file of data in a manner wherein all documents with the same sort key will have the same sort number when sequentially read for ascending order and incrementing the sort number in ascending numerical order upon encountering a descending physical sequence order, and
    transporting said documents to said selected pockets identified by sort numbers assigned to said record file of data.

3. A machine process for sorting a plurality of documents into selected pockets by utilizing pre-existing sequences in a stream of documents comprising the steps of:
    reading key data from the documents in physical sequence order and writing such data into memory file,
    sorting the memory file in numerical sequence corresponding to the key data read from the documents,
    reading the sorted memory file and assigning a sort number of each document data in the memory file for updating thereof dependent upon the key data and the sequential order of each document,
    sorting the updated memory file into the original document input sequence order, and sorting the documents physically into said selected pockets as identified by use of created sort numbers increased incrementally upon decrease of the physical sequence order within the sorted memory file.

4. The process of claim 3 wherein the step of sorting the memory file includes setting a sort number and a physical sequence order therein in digital relationship.

5. The process of claim 3 wherein the step of reading the stored memory file and assigning a sort number includes comparing the physical sequence order of the document with the data in the memory file.

6. A method of sorting documents having record data thereon into selected pockets of a sorter and utilizing pre-existing incoming sequences in a stream of documents comprising the steps of:

building a data file from reading record data on the documents, sorting the data file into sequence by document input sequence number within the document record data, assigning a sort number to each document record dependent upon the record data and the sequential order of each document;

reading record data from said data file into memory, comparing the data record read with the stored sequence number, assigning the stored sort number to the current data record, replacing the stored sequence number with the sequence number of the current data record, and updating the current record data in the data file for use in physically sorting the documents into said selected pockets identified by said assigned sort number increased incrementally upon decrease of said sequence number within the sorted data file.

7. The method of claim 6 including maintaining record of the previous data record read in the stored sequence number.

8. The method of claim 6 including the step of reading the subsequent data record after updating the current record data in the data file.

* * * * *

UNITED STATES PATENT AND TRADEMARK OFFICE
CERTIFICATE OF CORRECTION

PATENT NO. : 4,295,206
DATED : October 13, 1981
INVENTOR(S) : John D. Cain and Gary C. Lovie It is certified that error appears in the above-identified patent and that said Letters Patent are hereby corrected as shown below:

Column 7, line 10, "stored" should be -- sorted --.

Column 8, line 1, after "record" insert -- data --.

Column 8, line 14, after "number" insert -- as --.

Signed and Sealed this

Twelfth Day of January 1982

[SEAL]

Attest:

GERALD J. MOSSINGHOFF

Attesting Officer    Commissioner of Patents and Trademarks